United States Patent
Spanton et al.

(10) Patent No.: US 7,632,186 B2
(45) Date of Patent: Dec. 15, 2009

(54) SPECTATOR MODE FOR A GAME

(75) Inventors: Brian Spanton, Bellevue, WA (US);
Bachir Babale, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 491 days.

(21) Appl. No.: 11/282,747

(22) Filed: Nov. 21, 2005

(65) Prior Publication Data
US 2007/0117617 A1     May 24, 2007

(51) Int. Cl.
A63F 9/24 (2006.01)
(52) U.S. Cl. .............................. 463/40; 463/29; 463/42
(58) Field of Classification Search ................... 463/42, 463/29, 40
See application file for complete search history.

(56) References Cited

U.S. PATENT DOCUMENTS

| | | | |
|---|---|---|---|
| 5,774,668 A | 6/1998 | Choquier et al. | |
| 5,850,352 A | 12/1998 | Moezzi et al. | |
| 5,926,179 A | 7/1999 | Matsuda et al. | |
| 6,040,841 A | 3/2000 | Cohen et al. | |
| 6,325,717 B1 | 12/2001 | Kawagoe et al. | |
| 6,352,479 B1 | 3/2002 | Sparks, II | |
| 6,999,083 B2 * | 2/2006 | Wong et al. .................. | 345/473 |
| 7,148,895 B2 * | 12/2006 | Konishi et al. .............. | 345/473 |
| 2002/0183115 A1 | 12/2002 | Takahashi et al. | |
| 2003/0038805 A1 | 2/2003 | Wong et al. | |
| 2003/0220143 A1 | 11/2003 | Shteyn et al. | |
| 2006/0058103 A1 * | 3/2006 | Danieli et al. .................. | 463/42 |
| 2008/0125226 A1 * | 5/2008 | Emmerson .................... | 463/42 |

FOREIGN PATENT DOCUMENTS

| | | |
|---|---|---|
| GB | 2409417 (A) | 6/2005 |
| WO | WO9846029 | 10/1998 |
| WO | WO0175545 | 10/2004 |

OTHER PUBLICATIONS

Martin Otten, "Broadcasting Virtual Games in the Internet," Jun. 2001, 11 pages.
GameSpy.com—Article: Multicast Spectator Tech for Half-Life, printed from http://archive.gamespy.com/articles/june01/hlmod3b Jun. 2001, 4 pages.

(Continued)

*Primary Examiner*—Peter DungBa Vo
*Assistant Examiner*—Masud Ahmed
(74) *Attorney, Agent, or Firm*—Lee & Hayes, PLLC

(57) ABSTRACT

Methods and systems for broadcasting game sessions to be viewable by spectators are disclosed. In addition to sending telemetry data to other game clients participating in a game session, one or more game clients in the game session also sends the game telemetry data to a title server for the video game being played. The title server analyzes and repackages the received telemetry data and rebroadcasts the repackaged telemetry as a spectator feed to non-participant spectator client devices for viewing by users of the spectator client devices. Each spectator client device can analyze and manipulate the received telemetry data using a copy of the video game executing on the spectator client device, or may simply playback the feed when the feed includes a complete audiovisual file.

20 Claims, 10 Drawing Sheets

OTHER PUBLICATIONS

Gibstats—Welcome printed from http://gibstats.planetquake.gamespy.com/index.html 1 page.

David Vronay, et al., "Streaming Media Interfaces for Chat," Virtual World Group, Microsoft Research, 7 pages.

Gibstats—Dec. 14, 2000, http://www.planetquake.com/gibstats/index.html, 27 pages.

John "JCal" Callaham, "Valve's Multicast Tech Interview," printed from https://mail.internet2.edu/wws/arc/wg-multicast/2001-04/msg00015.html, Apr. 13, 2001,3 pages.

Steven Mark Drucker, "Intelligent Camera Control for Graphical Environments," MIT Media Lab, Apr. 29, 1994, 207 pages.

"Pervasive Gaming Goes Mainstream," printed from http://www.marketresearch.com/product/display.asp?productid=275... on May 22, 2006, 3 pages.

Michael F. Cohen, et al., "The Virtual Cinematographer: A Paradigm for Automatic Real-Time Camera Control and Directing," printed from http://research.microsoft.com/research/pubs/view.aspx?pubid=145 on May 2, 2006, 1 page.

"Valve's Multicast Tech Interview," printed from http://www.ukterrorist.com/news/317/ on May 2, 2006, 2 pages.

* cited by examiner

SPECTATOR MODE FOR A GAME

BACKGROUND

Computer and video games have matured from the likes of "Pong" into epic adventures having rich storylines, photorealistic graphics, and complex interaction systems, thereby allowing a player to immerse herself in the alternative reality that is emulated by the video game. The term video or computer game typically refers to any game played on a data processing device. Examples of video games may include computer games, game console games (e.g., playable on the XBOX®, PLAYSTATION®, and/or NINTENDO® brand game consoles), coin-operated or token-operated arcade games, portable gaming device games (e.g., playable on the Nokia N-GAGE®, PLAYSTATION PORTABLE®, NINTENDO DS®, Gizmondo, mobile phone, etc.), or other software-driven games. A video or computer game may refer to any software driven application that provides a graphically depicted virtual environment, and having one or more objectives that one or more characters attempt to complete within the virtual environment under a set of predetermined constraints or rules. Each character controlled by a player/user may be referred to as a player-character (PC); each computer controlled character may be referred to as a non-player-character (NPC).

Video games can be divided into many genres, such as first-person shooters (FPS), role-playing games (RPG), simulation, sports, strategy, action and driving, to name a few. Each video game is not necessarily limited to a single genre, and may indeed encompass multiple genres. For example, one genre of video games is referred to as a first-person shooter (FPS) genre. The display screen for FPS games typically provides a first person point of view, e.g., as if the player is viewing the video game's virtual world through the eyes of the character the player is controlling. Popular FPS games include the HALO®, DOOM®, QUAKE®, DUKE NUKEM™, and HALF-LIFE® franchises.

FPS games are very popular, in part because they are particularly well suited to multiplayer game play. In many multiplayer games, each participant controls a player-character within the virtual environment, and the participants either work alone or in teams to complete their objective(s) for a particular game. Multiplayer FPS games may provide different objectives in various game modes, thus providing a variety of gameplay types to participants. Some known multiplayer game modes include every-man-for-himself, every-team-for-itself, capture the flag, assault, and king of the hill. Every-man-for-himself format, referred to in the HALO® franchise as Slayer mode, and referred to in the QUAKE® franchise as Deathmatch mode, refers to a multiplayer game where each participant tries to kill all other participants in the graphically simulated virtual environment, e.g., within a specific period of time, a specific number of times, etc. Every-team-for-itself refers to a multiplayer game where groups of participants attempt to kill competing groups of participants in the graphically simulated virtual environment. In capture the flag, the video game simulates a flag in the virtual environment, and teams compete to capture the flag from an initial position and return the flag to a home base of the capturing team. In the assault game mode, teams attempt to penetrate a home base of competing teams and plant a bomb or flag in the competing team's base. Finally, in king of the hill, players or teams attempt to control a specific location for a preset period of time. The first player or team to control the specific location for that preset period of time wins. Each of the above game modes may have various modifications and settings that can be customized from one game to the next.

Regardless of the game mode, players naturally progress in skill, some faster than others, and certain players become very skilled at particular FPS games or other game types. Other less-skilled players subsequently might have a difficult time developing skills as a result of being so easily beaten by the more skilled players. Some games allow other participating players to spectate game play between lives, or between rounds but before all players have finished the current round, etc. Spectating in this manner is accomplished by the participating players' game consoles joining the game and sending game telemetry data to the other participating players' game consoles. However, non-participating players cannot spectate the game. Thus, it would be an advance in the art to provide a system whereby non-participating players or users could also spectate a game, thereby able to observe game play styles and strategies of other players.

SUMMARY

The following presents a simplified summary in order to provide a basic understanding of some aspects described herein. This summary is not an extensive overview of the features herein. It is not intended to identify key or critical elements, or to delineate the scope of this application. The following summary merely presents some concepts in a simplified form as a prelude to the more detailed description provided below.

Thus, an aspect is directed to one or more computer-readable media storing computer-executable instructions that, when executed, perform a method of distributing game data to a non-participant of the game so the non-participant can spectate a game being played by other players. Another aspect performs a method of distributing game telemetry data corresponding to a multiplayer game session of a video game to a spectator client to allow a user of the spectator client to spectate the game session. A title server receives, over a computer network, game telemetry data generated by participant clients of the multiplayer game session of the video game, where each participant client is executing the video game under the control of a user of the participant client. The title server creates a spectator feed by aggregating the received game telemetry data. Upon receiving a request for the spectator feed from a spectator client not participating in the game session, the title server sends the spectator feed over the computer network to the spectator client.

Another aspect provides a method for a non-participating spectator client (such as a game console, PC, etc.) to spectate a multiplayer game session of a video game title. The spectator client sends over a computer network to a title server corresponding to the video game title a request to spectate the game session, and receives from the title server over the computer network, game telemetry data corresponding to participant clients in the multiplayer game session. The spectator client then executes the video game title using the received game telemetry data.

BRIEF DESCRIPTION OF THE DRAWINGS

A more complete understanding of the various features and advantages thereof may be acquired by referring to the following description in consideration of the accompanying drawings, in which like reference numbers indicate like features, and wherein.

DETAILED DESCRIPTION

In the following description of the various aspects, reference is made to the accompanying drawings, which form a part hereof, and in which is shown by way of illustration various features described herein may be practiced. It is to be understood that other embodiments may be used and structural and functional modifications may be made.

Figure 1:
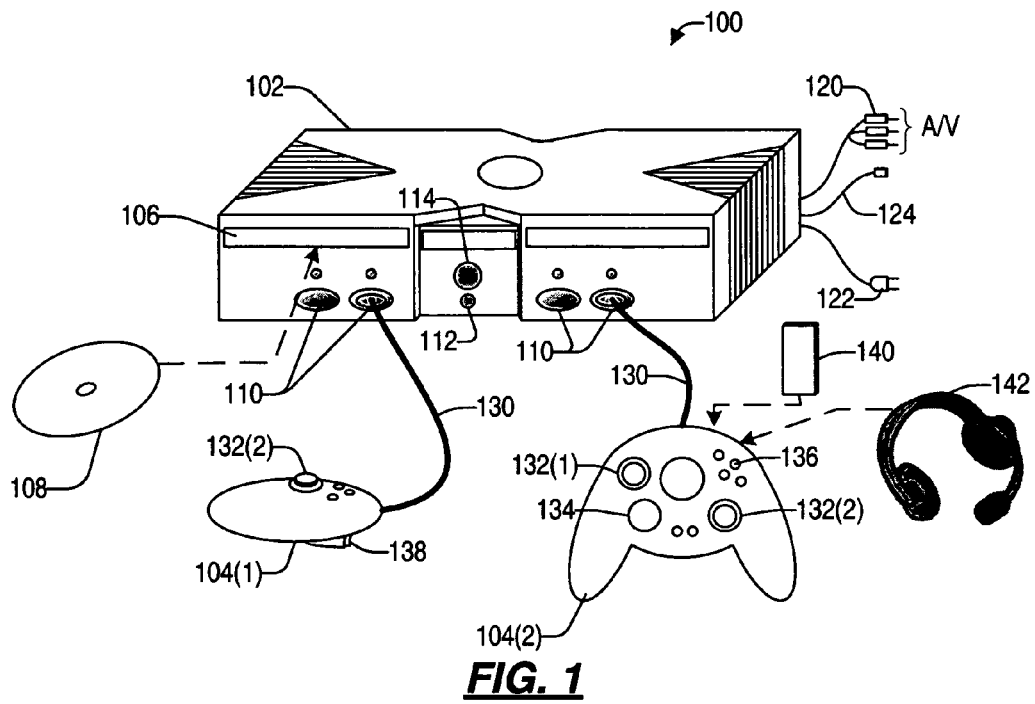
FIG. 1 illustrates a gaming system that may be used according to an illustrative embodiment.

FIG. 1 illustrates an example of a suitable gaming system environment 100 on which computer games, video games, and or other electronic games (collectively referred to herein as computer or video games) may be played. The gaming system environment 100 is only one example of a suitable computing environment and is not intended to suggest any limitation as to the scope of use or functionality of the features described herein. Neither should the gaming system environment 100 be interpreted as having any dependency or requirement relating to any one or combination of components illustrated in the illustrative operating gaming system environment 100.

Aspects described herein are operational with numerous other general purpose or special purpose computing system environments or configurations. Examples of well known computing systems, environments, and/or configurations that may be suitable for use include, but are not limited to, personal computers; server computers; portable and hand-held devices such as personal digital assistants (PDAs), tablet PCs or laptop PCs; multiprocessor systems; microprocessor-based systems; set top boxes; programmable consumer electronics; network PCs; minicomputers; mainframe computers; electronic game consoles, distributed computing environments that include any of the above systems or devices; and the like.

Aspects herein may be described in the general context of computer-executable instructions, such as program modules, being executed by a computer. Generally, program modules include routines, programs, objects, components, data structures, etc. that perform particular tasks or implement particular abstract data types. The features described herein may also be practiced in distributed computing environments where tasks are performed by remote processing devices that are linked through a communications network. In a distributed computing environment, program modules may be located in both local and remote computer storage media including memory storage devices.

FIG. 1 shows an exemplary gaming system 100. Gaming system 100 may include a game console 102 and one or more handheld controllers, as represented by controllers 104(1) and 104(2). The game console 102 may be equipped with an internal or external hard disk drive and a portable media drive 106 that supports various forms of portable storage media as represented by optical storage disc 108. Examples of suitable portable storage media include DVD, CD-ROM, game discs, and so forth.

Game console 102 may have a number of slots 110 on its front face to support up to four controllers, although the number and arrangement of slots may be modified. A power button 112 and an eject button 114 are also positioned on the front face of the game console 102; The power button 112 switches power to the game console and the eject button 114 alternately opens and closes a tray of the portable media drive 106 to allow insertion and extraction of the storage disc 108.

Game console 102 may connect to a television or other display (not shown) via AN interfacing cables 120. A power cable 122 provides power to the game console. Game console 102 may further be configured with broadband network capabilities, as represented by the cable or modem connector 124 to facilitate access to a network, such as the Internet. Connector 124 may also be fitted with a wireless adapter to connect to one or more wireless networks.

Each controller 104 may be coupled to the game console 102 via a wire or wireless interface. In the illustrated implementation, the controllers are USB (Universal Serial Bus) compatible and are connected to the console 102 via USB cables 130. Controller 102 may be equipped with any of a wide variety of user interaction mechanisms. As illustrated in FIG. 1, each controller 104 may be equipped with two thumbsticks 132(1) and 132(2), a D-pad 134, buttons 136 (e.g., 'A', 'B', 'X', 'Y'), and two triggers 138. The thumbsticks 132 may be analog directional control units, and may include analog potentiometers to detect a degree of position in the X- and Y-coordinates. D-pad 134 may be a directional pad, with inputs for entering directional commands such as up, down, left and right, or combinations of these directions (e.g., upper-left). D-pad 134 may also be analog, and may provide input as to a degree of pressure used to press in a particular direction. These mechanisms are merely representative, and other known gaming mechanisms may be substituted for or added to those shown in FIG. 1.

A memory unit (MU) 140 may be inserted into the controller 104 to provide additional and portable storage. Portable memory units enable users to store game parameters and user accounts, and port them for play on other consoles. In the described implementation, each controller is configured to accommodate two memory units 140, although more or less than two units may be employed in other implementations. A headset 142 may be connected to the controller 104 or game console 102 to provide audio communication capabilities. Headset 142 may include a microphone for audio input and one or more speakers for audio output.

Gaming system 100 is capable of playing, for example, games, music, and videos. With the different storage offerings, titles can be played from the hard disk drive or the portable medium 108 in drive 106, from an online source, or from a memory unit 140. For security, in some embodiments executable code can only be run from the portable medium 108. A sample of what gaming system 100 is capable of playing include game titles played from CD and DVD discs, from the hard disk drive, or from an online source; digital music played from a CD in the portable media drive 106, from a file on the hard disk drive (e.g., "WINDOWS™" Media Audio (WMA) format), or from online streaming sources; and digital audio/video played from a DVD disc in the portable media drive 106, from a file on the hard disk drive (e.g., Active Streaming Format), or from online streaming sources.

Figure 2:
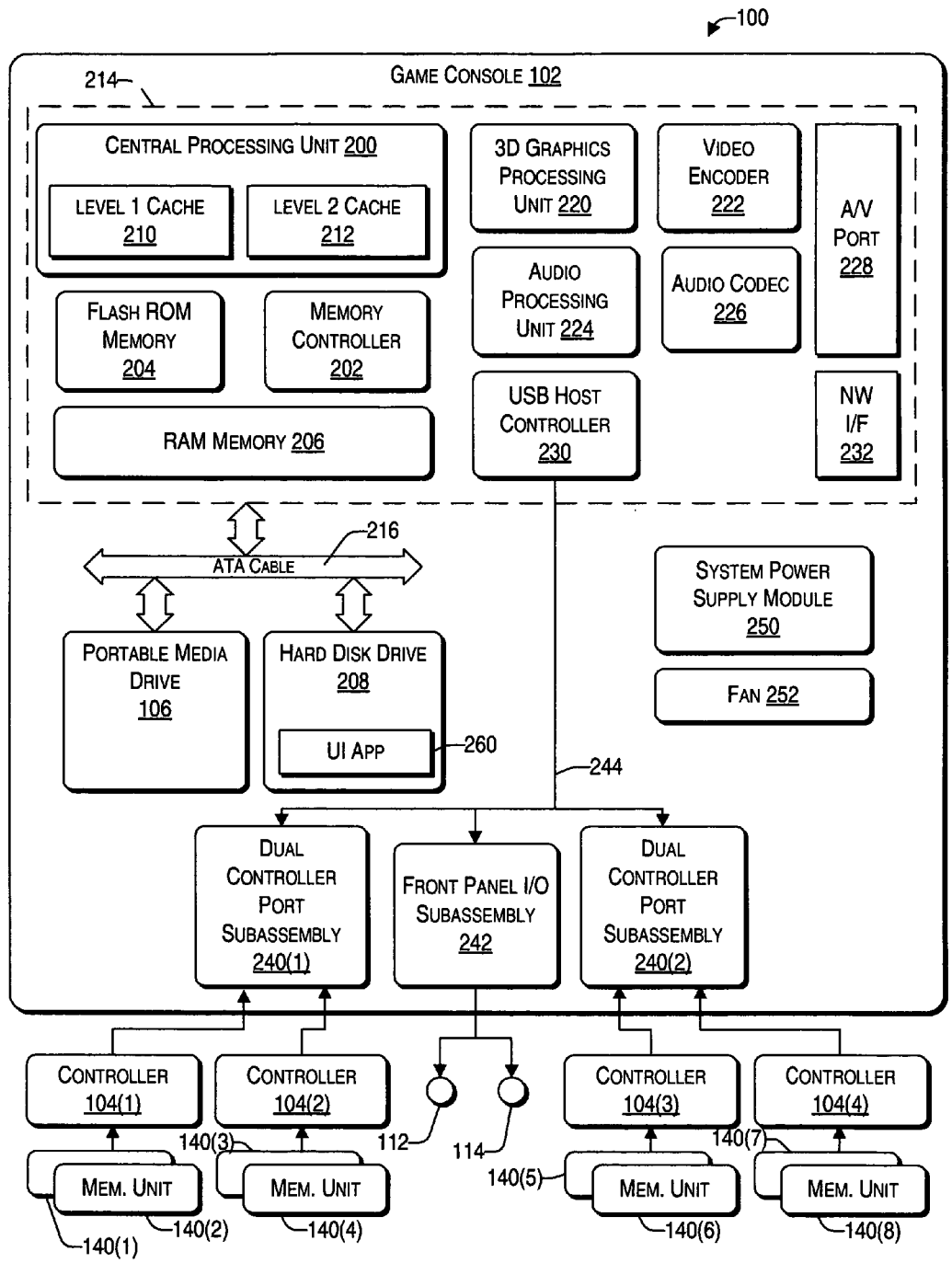
FIG. 2 illustrates a block diagram of the gaming system shown in FIG. 1.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

As one suitable implementation, the CPU 200, memory controller 202, ROM 204, and RAM 206 are integrated onto a common module 214. In this implementation, ROM 204 is configured as a flash ROM that is connected to the memory controller 202 and a ROM bus (not shown). RAM 206 is configured as multiple DDR SDRAM (Double Data Rate Synchronous Dynamic RAM) that are independently controlled by the memory controller 202 via separate buses (not shown). The hard disk drive 208 and portable media drive 106 are connected to the memory controller via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)-104(4). The network interface 232 provides access to a network (e.g., Internet, home network, etc.) and may be any of a wide variety of various wire or wireless interface components including an Ethernet card, a modem, a Bluetooth module, a cable modem, and the like.

The game console 102 has two dual controller support subassemblies 240(1) and 240(2), with each subassembly supporting two game controllers 104(1)-104(4). A front panel I/O subassembly 242 supports the functionality of the power button 112 and the eject button 114, as well as any LEDs (light emitting diodes) or other indicators exposed on the outer surface of the game console. The subassemblies 240(1), 240(2), and 242 are coupled to the module 214 via one or more cable assemblies 244.

Eight memory units 140(1)-140(8) are illustrated as being connectable to the four controllers 104(1)-104(4), i.e., two memory units for each controller. Each memory unit 140 offers additional storage on which games, game parameters, and other data may be stored. When inserted into a controller, the memory unit 140 can be accessed by the memory controller 202.

A system power supply module 250 provides power to the components of the gaming system 100. A fan 252 cools the circuitry within the game console 102.

The game console 102 implements a uniform media portal model that provides a consistent user interface and navigation hierarchy to move users through various entertainment areas. The portal model offers a convenient way to access content from multiple different media types—game data, audio data, and video data—regardless of the media type inserted into the portable media drive 106.

To implement the uniform media portal model, a console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console.

The gaming system 100 may be operated as a standalone system by simply connecting the system to a television or other display. In this standalone mode, the gaming system 100 allows one or more players to play games, watch movies, or listen to music. However, with the integration of broadband connectivity made available through the network interface 232, the gaming system 100 may further be operated as a participant in a larger network gaming community. This network gaming environment is described next.

Figure 3:
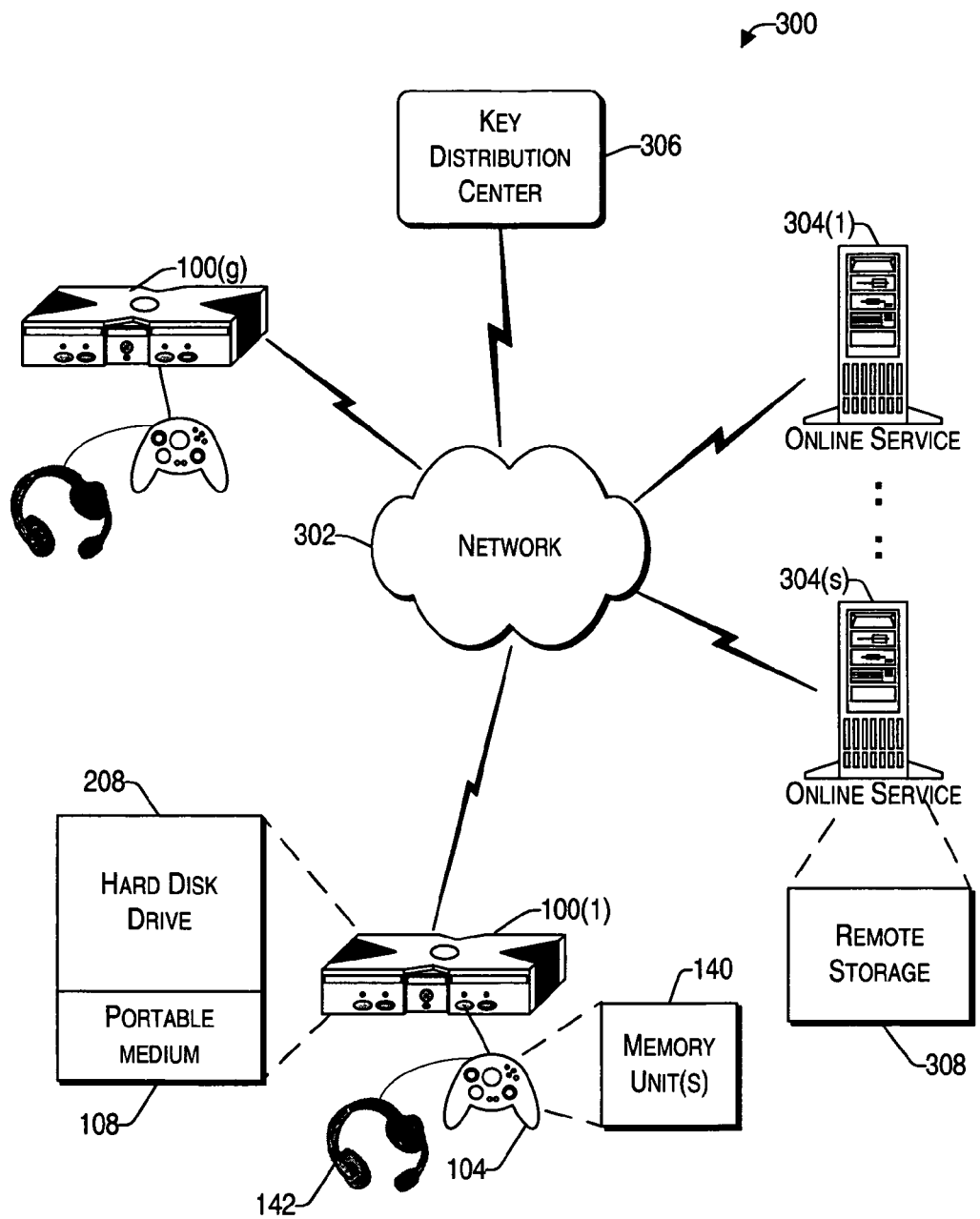
FIG. 3 illustrates a block diagram of a network gaming system according to an illustrative aspect.

FIG. 3 shows an exemplary network gaming environment 300 that interconnects multiple gaming systems 100(1), . . . , 100(g) via a network 302. The network 302 represents any of a wide variety of data communications networks. It may include public portions (e.g., the Internet) as well as private portions (e.g., a residential Local Area Network (LAN)), as well as combinations of public and private portions. Network 302 may be implemented using any one or more of a wide variety of conventional communications media including both wired and wireless media. Any of a wide variety of communications protocols can be used to communicate data via network 302, including both public and proprietary protocols. Examples of such protocols include TCP/IP, IPX/SPX, NetBEUI, etc.

In addition to gaming systems 100, one or more online services 304(1), . . . , 304(s) may be accessible via the network 302 to provide various services for the participants, such as hosting online games, serving downloadable music or video files, hosting gaming competitions, serving streaming audio/video files, and the like. The network gaming environment 300 may further involve a key distribution center 306 that plays a role in authenticating individual players and/or gaming systems 100 to one another as well as online services 304. The distribution center 306 distributes keys and service tickets to valid participants that may then be used to form games amongst multiple players or to purchase services from the online services 304.

The network gaming environment 300 introduces another memory source available to individual gaming systems 100—online storage. In addition to the portable storage medium 108, the hard disk drive 208, and the memory unit(s) 140, the gaming system 100(1) can also access data files available at remote storage locations via the network 302, as exemplified by remote storage 308 at online service 304(s).

Figure 4:
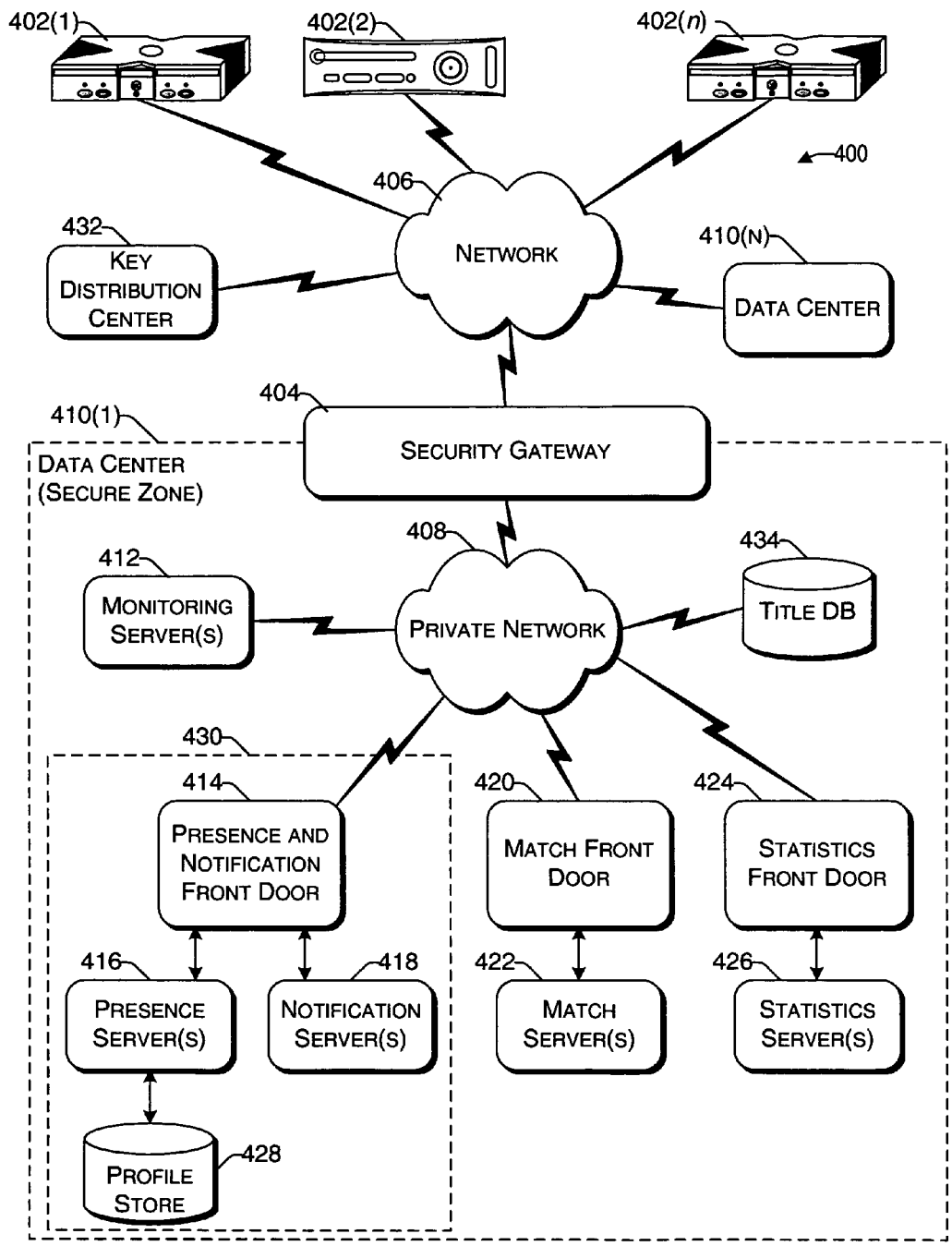
FIG. 4 illustrates another block diagram of an online gaming environment according to an illustrative aspect.

FIG. 4 is a block diagram of another illustrative online gaming environment 400, e.g. "XBOX™ LIVE™" by Microsoft Corporation of Redmond, Wash. Multiple game consoles 402(1), 402(2), . . . , 402(n) are coupled to a security gateway 404 via a network 406. Each game console 402 can be, for example, a game console 102 of FIG. 1 or FIG. 2. Network 406 represents any one or more of a variety of conventional data communications networks. Network 406 will typically include packet switched networks, but may also include circuit switched networks. Network 406 can include wire and/or wireless portions. In one exemplary implementation, network 406 includes the Internet and may optionally include one or more local area networks (LANs) and/or wide area networks (WANs). At least a part of network 406 is a public network, which refers to a network that is publicly-accessible. Virtually anyone can access the public network.

In some situations, network 406 includes a LAN (e.g., a home network), with a routing device situated between game console 402 and security gateway 404. This routing device may perform network address translation (NAT), allowing the multiple devices on the LAN to share the same IP address on the Internet, and also operating as a firewall to protect the device(s) on the LAN from access by malicious or mischievous users via the Internet.

Security gateway 404 operates as a gateway between public network 406 and a private network 408. Private network 408 can be any of a wide variety of conventional networks, such as a local area network. Private network 408, as well as other devices discussed in more detail below, is within a data center 410 that operates as a secure zone. Data center 410 is made up of trusted devices communicating via trusted communications. Thus, encryption and authentication within secure zone 410 is not necessary. The private nature of network 408 refers to the restricted accessibility of network 408—access to network 408 is restricted to only certain individuals (e.g., restricted by the owner or operator of data center 410).

Security gateway 404 is a cluster of one or more security gateway computing devices. These security gateway computing devices collectively implement security gateway 404. Security gateway 404 may optionally include one or more conventional load balancing devices that operate to direct requests to be handled by the security gateway computing devices to appropriate ones of those computing devices. This directing or load balancing is performed in a manner that attempts to balance the load on the various security gateway computing devices approximately equally (or alternatively in accordance with some other criteria).

Also within data center 410 are: one or more monitoring servers 412; one or more presence and notification front doors 414, one or more presence servers 416, one or more notification servers 418, and a profile store 428 (collectively implementing a presence and notification service or system 430); one or more match front doors 420 and one or more match servers 422 (collectively implementing a match service); and one or more statistics front doors 424 and one or more statistics servers 426 (collectively implementing a statistics service). The servers 416, 418, 422, and 426 provide services to game consoles 402, and thus can be referred to as service devices. Other service devices may also be included in addition to, and/or in place of, one or more of the servers 416, 418, 422, and 426. Additionally, although only one data center is shown in FIG. 4, alternatively multiple data centers may exist with which game consoles 402 can communicate. These data centers may operate independently, or alternatively may operate collectively (e.g., to make one large data center available to game consoles 102,402).

Game consoles 402 are situated remotely from data center 410, and access data center 410 via network 406. A game console 402 desiring to communicate with one or more devices in the data center logs in to the data center and establishes a secure communication channel between the console 402 and security gateway 404. Game console 402 and security gateway 404 encrypt and authenticate data packets being passed back and forth, thereby allowing the data packets to be securely transmitted between them without being understood by any other device that may capture or copy the data packets without breaking the encryption. Each data packet communicated from game console 402 to security gateway 404, or from security gateway 404 to game console 402 can have data embedded therein. This embedded data is referred to as the content or data content of the packet. Additional information may also be inherently included in the packet based on the packet type (e.g., a heartbeat packet).

The secure communication channel between a console 402 and security gateway 404 is based on a security ticket. Console 402 authenticates itself and the current user(s) of console 402 to a key distribution center 432 and obtains, from key distribution center 432, a security ticket. Console 402 then uses this security ticket to establish the secure communication channel with security gateway 404. In establishing the secure communication channel with security gateway 404, the game console 402 and security gateway 404 authenticate themselves to one another and establish a session security key that is known only to that particular game console 402 and the security gateway 404. This session security key is used to encrypt data transferred between the game console 402 and the security gateway cluster 404, so no other devices (including other game consoles 402) can read the data. The session security key is also used to authenticate a data packet as being from the security gateway 404 or game console 402 that the data packet alleges to be from. Thus, using such session security keys, secure communication channels can be established between the security gateway 404 and the various game consoles 402.

Once the secure communication channel is established between a game console 402 and the security gateway 404, encrypted data packets can be securely transmitted between the two. When the game console 402 desires to send data to a particular service device in data center 410, the game console 402 encrypts the data and sends it to security gateway 404 requesting that it be forwarded to the particular service device (s) targeted by the data packet. Security gateway 404 receives the data packet and, after authenticating and decrypting the data packet, encapsulates the data content of the packet into another message to be sent to the appropriate service via private network 408. Security gateway 404 determines the appropriate service for the message based on the requested service(s) targeted by the data packet.

Similarly, when a service device in data center 410 desires to communicate data to a game console 402, the data center sends a message to security gateway 404, via private network 408, including the data content to be sent to the game console 402 as well as an indication of the particular game console 402 to which the data content is to be sent. Security gateway 404 embeds the data content into a data packet, and then encrypts the data packet so it can only be decrypted by the particular game console 402 and also authenticates the data packet as being from the security gateway 404.

Although discussed herein as primarily communicating encrypted data packets between security gateway 404 and a game console 402, alternatively some data packets may be partially encrypted (some portions of the data packets are encrypted while other portions are not encrypted). Which portions of the data packets are encrypted and which are not can vary based on the desires of the designers of data center 410 and/or game consoles 402. For example, the designers may choose to allow voice data to be communicated among consoles 402 so that users of the consoles 402 can talk to one another—the designers may further choose to allow the voice data to be unencrypted while any other data in the packets is encrypted. Additionally, in another alternative, some data packets may have no portions that are encrypted (that is, the entire data packet is unencrypted). It should be noted that, even if a data packet is unencrypted or only partially encrypted, all of the data packet can still be authenticated.

Each security gateway device in security gateway 404 is responsible for the secure communication channel with typically one or more game consoles 402, and thus each security gateway device can be viewed as being responsible for managing or handling one or more game consoles. The various security gateway devices may be in communication with each other and communicate messages to one another. For example, a security gateway device that needs to send a data packet to a game console that it is not responsible for managing may send a message to all the other security gateway devices with the data to be sent to that game console. This message is received by the security gateway device that is responsible for managing that game console and sends the appropriate data to that game console. Alternatively, the security gateway devices may be aware of which game consoles are being handled by which security gateway devices—this may be explicit, such as each security gateway device maintaining a table of game consoles handled by the other security gateway devices, or alternatively implicit, such as determining which security gateway device is responsible for a particular game console based on an identifier of the game console.

Monitoring server(s) 412 operate to inform devices in data center 410 of an unavailable game console 402 or an unavailable security gateway device of security gateway 404. Game consoles 402 can become unavailable for a variety of different reasons, such as a hardware or software failure, the console being powered-down without logging out of data center 410, the network connection cable to console 402 being disconnected from console 402, other network problems (e.g., the LAN that the console 402 is on malfunctioning), etc. Similarly, a security gateway device of security gateway 404 can become unavailable for a variety of different reasons, such as hardware or software failure, the device being powered-down, the network connection cable to the device being disconnected from the device, other network problems, etc.

Each of the security gateway devices in security gateway 404 is monitored by one or more monitoring servers 412, which detect when one of the security gateway devices becomes unavailable. In the event a security gateway device becomes unavailable, monitoring server 412 sends a message to each of the other devices in data center 410 (servers, front doors, etc.) that the security gateway device is no longer available. Each of the other devices can operate based on this information as it sees fit (e.g., it may assume that particular game consoles being managed by the security gateway device are no longer in communication with data center 410 and perform various clean-up operations accordingly). Alternatively, only certain devices may receive such a message from the monitoring server 412 (e.g., only those devices that are concerned with whether security gateway devices are available).

Security gateway 404 monitors the individual game consoles 402 and detects when one of the game consoles 402 becomes unavailable. When security gateway 404 detects that a game console is no longer available, security gateway 404 sends a message to monitoring server 412 identifying the unavailable game console. In response, monitoring server 412 sends a message to each of the other devices in data center 410 (or alternatively only selected devices) that the game console is no longer available. Each of the other devices can then operate based on this information as it sees fit.

Presence server(s) 416 hold and process data concerning the status or presence of a given user logged in to data center 410 for online gaming. Notification server(s) 418 maintains multiple notification queues of outgoing messages destined for a player logged in to data center 410. Presence and notification front door 414 is one or more server devices that operate as an intermediary between security gateway 404 and servers 416 and 418. One or more load balancing devices (not shown) may be included in presence and notification front door 414 to balance the load among the multiple server devices operating as front door 414. Security gateway 404 communicates messages for servers 416 and 418 to the front door 414, and the front door 414 identifies which particular server 416 or particular server 418 the message is to be communicated to. By using front door 414, the actual implementation of servers 416 and 418, such as which servers are responsible for managing data regarding which users, is abstracted from security gateway 404. Security gateway 404 can simply forward messages that target the presence and notification service to presence and notification front door 414 and rely on front door 414 to route the messages to the appropriate one of server(s) 416 and server(s) 418.

Match server(s) 422 hold and process data concerning the matching of online players to one another. An online user is able to advertise a game available for play along with various characteristics of the game (e.g., the location where a football game will be played, whether a game is to be played during the day or at night, the user's skill level, etc.). These various characteristics can then be used as a basis to match up different online users to play games together. Match front door 420 includes one or more server devices (and optionally a load balancing device(s)) and operates to abstract match server(s) 422 from security gateway 404 in a manner analogous to front door 414 abstracting server(s) 416 and server(s) 418.

Statistics server(s) 426 hold and process data concerning various statistics for online games. The specific statistics used can vary based on the game designer's desires (e.g., the top ten scores or times, a world ranking for all online players of the game, a list of users who have found the most items or spent the most time playing, etc.). Statistics front door 426 includes one or more server devices (and optionally a load balancing device(s)) and operates to abstract statistics server(s) 426 from security gateway 404 in a manner analogous to front door 414 abstracting server(s) 416 and server(s) 418.

Thus, it can be seen that security gateway 404 operates to shield devices in the secure zone of data center 410 from the untrusted, public network 406. Communications within the secure zone of data center 410 need not be encrypted, as all devices within data center 410 are trusted. However, any information to be communicated from a device within data center 410 to a game console 402 passes through security gateway cluster 404, where it is encrypted in such a manner that it can be decrypted by only the game console 402 targeted by the information.

FIG. 4 illustrates a single data center 410(1) in detail. However, multiple data centers 410(1) . . . 410(n) may be used. For example, a first data center 410(1) may be used to manage an online gaming network such as XBOX® LIVE, while another data center may be used to manage similar functions for a specific game title, e.g., HALO® 2. A data center specific to a game title may be alternatively referred to as a title server. A game console may obtain an address, e.g., an IP address, of a title server from key distribution center 432 upon authentication and identification of the game title presently being played on the game console. Alternatively, the game console may obtain the address of a title server from a title database 434 of the data center 410.

One or more features described herein may be embodied in computer-executable instructions (i.e., software) stored in RAM memory 206, non-volatile memory 108, 208, 308, or any other resident memory on game console 102. Generally, software modules include routines, programs, objects, components, data structures, etc. that perform particular tasks or implement particular abstract data types when executed by a processor in a computer or other device. The computer executable instructions may be stored on a computer readable medium such as one or more hard disks 208, removable storage media 108 (e.g., CD-ROM, DVD, disk, etc.), solid state memory, RAM 206, etc. The functionality of the software modules may be combined or distributed as desired in various embodiments. In addition, the functionality may be embodied in whole or in part in firmware or hardware equivalents such as application specific integrated circuits (ASIC), field programmable gate arrays (FPGA), and the like.

Figure 5:
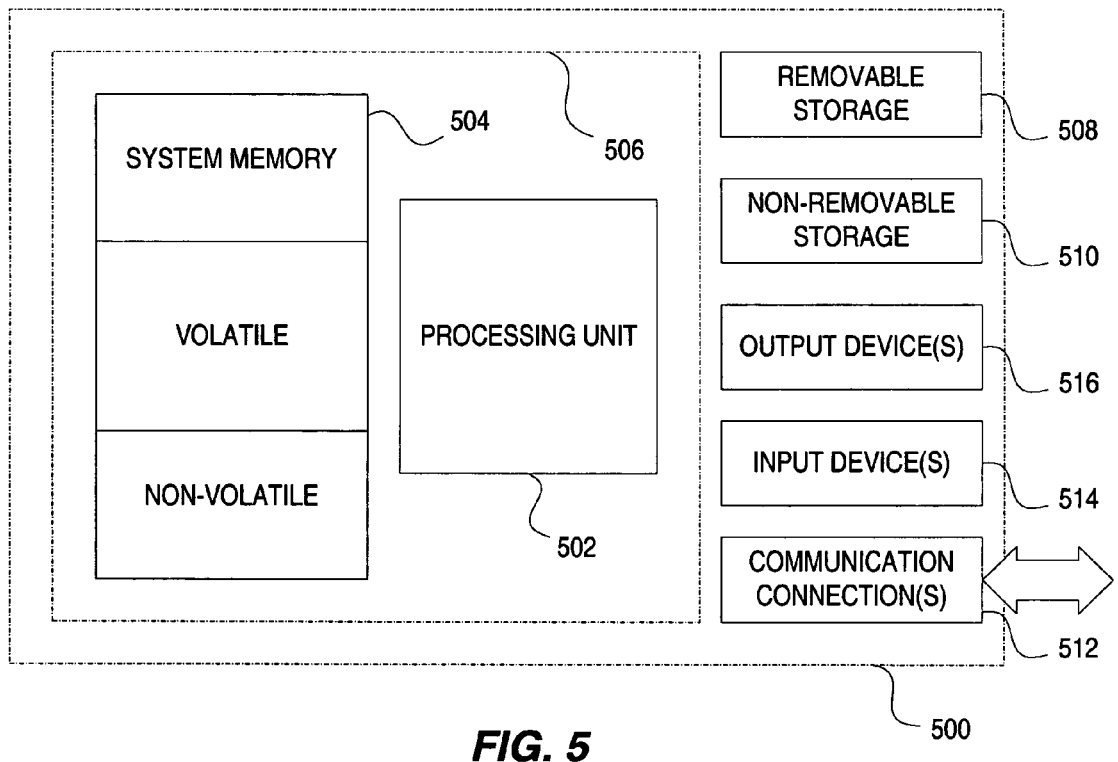
FIG. 5 illustrates a block diagram of a general purpose data processing device that may be used according to one or more illustrative aspects.

Aspects herein are not limited to console computing environments. Indeed, these aspects may also be implemented in video games that operate on personal computers (PC). FIG. 5 illustrates an example of a suitable computing system environment 500 on which the features described herein may be implemented. The computing system environment 500 is only one example of a suitable computing environment and is not intended to suggest any limitation as to the scope of use or functionality of the features described herein. Neither should the computing environment 500 be interpreted as having any dependency or requirement relating to any one or combination of components illustrated in the exemplary operating environment 500.

The features herein are operational with numerous other general purpose or special purpose computing system environments or configurations. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The features herein may be described in the general context of computer-executable instructions, such as program modules, being executed by a computer. Generally, program modules include routines, programs, objects, components, data structures, etc., that perform particular tasks or implement particular abstract data types. The features may also be practiced in distributed computing environments where tasks are performed by remote processing devices that are linked through a communications network. In a distributed computing environment, program modules may be located in both local and remote computer storage media including memory storage devices.

In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 5 by dashed line 506. Additionally, device 500 may also have additional features/functionality. For example, device 500 may also include additional storage (removable and/or non-removable) including, but not limited to, magnetic or optical disks or tape. Such additional storage is illustrated in FIG. 5 by removable storage 508 and non-removable storage 510. Computer storage media includes volatile and nonvolatile, removable and non-removable media implemented in any method or technology for storage of information such as computer readable instructions, data structures, program modules or other data instructing a device to operate as described herein. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Device 500 may also contain communications connection(s) 512 that allow the device to communicate with other devices. Communications connection(s) 512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computer 500 may include a variety of computer readable media. Computer readable media can be any available media that can be accessed by computer 500 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices (in the singular or the plural), or any other medium which can be used to store the desired information and which can accessed by computer 500. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Device 500 may also have input device(s) 514 such as keyboard, mouse, pen, voice input device, touch input device, etc. Output device(s) 516 such as a display, speakers, printer, etc. may also be included. All these devices are well know in the art and need not be discussed at length here.

Illustrative Embodiments

By way of introduction, one or more features and/or aspects described herein cause a game console to send intra-game data for a video game to a server that is capable of rebroadcasting the intra-game data to non-participants of the video game. The intra-game data may include positional telemetry and other game-state data (like controller buttons pushed or other user input) that is monitored and exchanged throughout a multiplayer game session. In real-time, or shortly thereafter, the telemetry data can be rebroadcast to and manipulated and re-rendered by non-participant's game consoles or other data processing devices. The rendering may be done by the same game engine that would run on a participating client, but instead running on a spectating client or on a server. When run on a server, the output may be sent to a video capture, which allows video clips to be available to all devices (not just game consoles) of the multiplayer game session.

Figure 6:
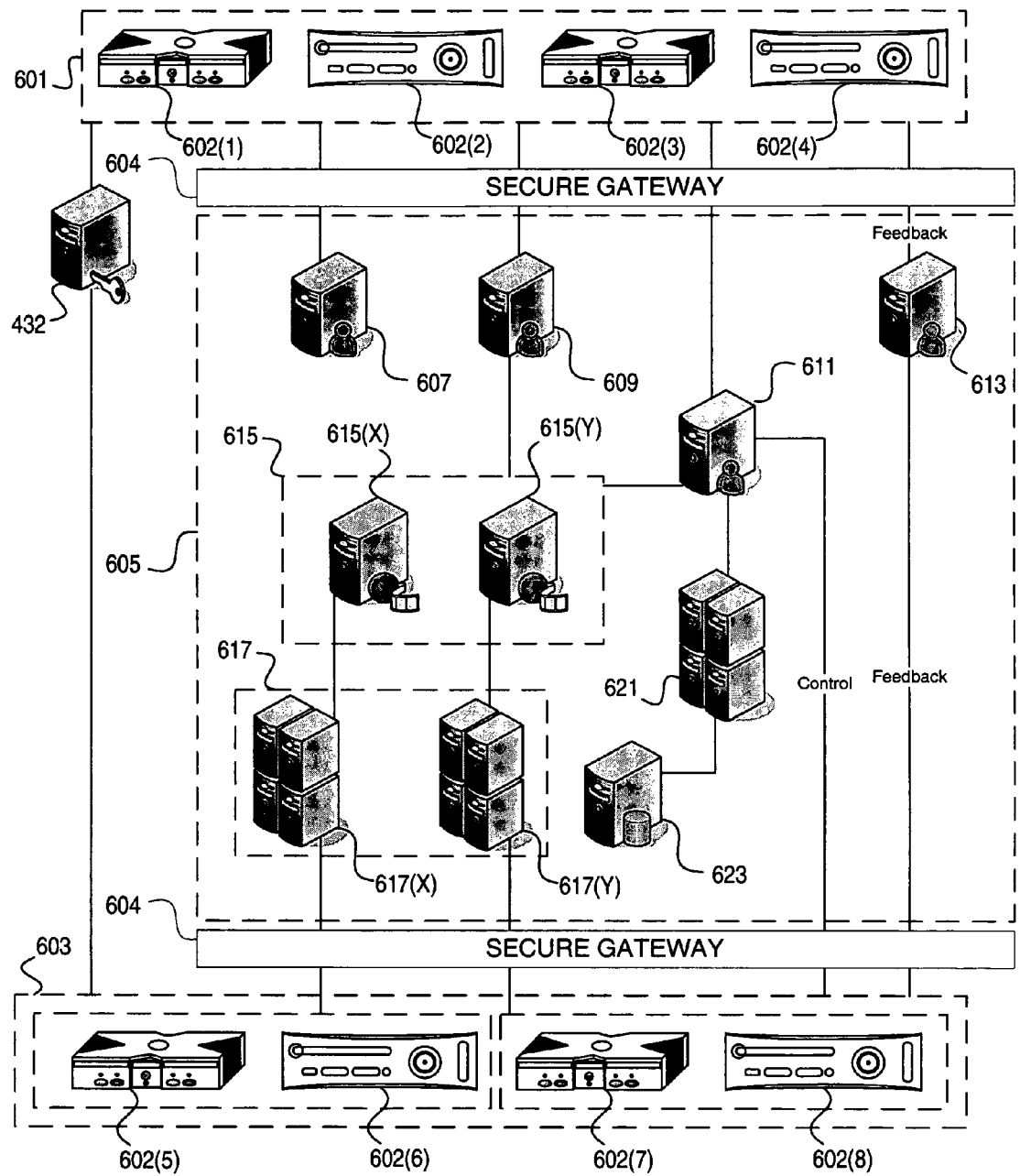
FIG. 6 illustrates a network architecture that may be used according to one or more illustrative aspects.

FIG. 6 illustrates a network architecture 600 that may be used to allow non-participants to spectate a game being played by one or more video game participants according to one or more illustrative aspects of the invention. Connections between components and nodes in FIG. 6 illustrate logical connections. Each connection may pass through one or more networks, such as the Internet. Where a line terminates in FIG. 6 at a broken line box surrounding multiple nodes or components, that line is considered to connect to each node or component within the broken line box. While FIG. 6 identifies particular connections that may be useful according to various aspects of the invention, FIG. 6 is not limiting and should not be interpreted to imply that other devices are not or cannot be communicatively connected. That is, each device and node is connected to one or more networks, and may communicate with each other device and node as necessary. The nodes within title server 605 represent logical network nodes, and multiple nodes may be implemented within the same physical server, combined with other network nodes, and/or performed by the same executable code or application service.

Each participant 601 plays a video game via game console 602(1) . . . 602(4), or some other data processing device on which the video game can be played, each referred to as a game client or participant client. A user of a participant client is referred to as a participant player. Each non-participant client 603 (also referred to as a spectator client) may include a video game console 602(5) . . . 602(8), or some other device which has not joined the multiplayer game session and is capable of receiving data from feed distributors 617, further described below. While four participant clients and four spectator clients are illustrated in FIG. 6, the number of participant clients and spectator clients are not so limited, as discussed further below. A spectator client may include game consoles or any other devices which may be used to spectate a game session, and from which the participant clients of the game session have no present expectation of receiving game telemetry data. That is, each spectator client has not "joined" the multiplayer game being spectated.

A participating client may refer to any client joined to a multiplayer game session, regardless of a status of a character controlled by the participant player (e.g., regardless of whether the character is "alive,"0 "dead," "active," or "inactive" in the multiplayer game session). The distinction as to whether a client has joined a multiplayer game session or not may vary from game to game. While the expectation of receiving game telemetry data may be used as an indication of whether a game client has joined a game session, other metrics may be used as well. In some games, participants may include players who control actions of one or more characters appearing at any time during the current and/or immediately successive game session, while spectators cannot control the actions of any characters appearing in the game session. In other games, a participant may include any game client directly connected to at least one of game client of the game session. As another example, one or more controller commands may be available to participants, while not being available to spectators. In some games, participants may include players for whom scoring data is kept for the session, such as total score, hit/miss ratio, favorite weapon, etc., while spectators have no such scoring data. The above metrics are not mutually exclusive, and combinations of them may be used by a game to determine whether a game client is a participant in the game session.

Each game console 602 communicates with key distribution server 432 to authenticate itself and obtain an address, e.g., and IP address, to a title server 605 corresponding to the video game. As discussed above, each video game title may have a dedicated title server developed and/or maintained by a developer of the video game title, or each video game title may share a title server with other commonly developed or similar video games. A title server provides all game specific services after the video game console authenticates itself to the network via key distribution center 432. Title server may be protected by a secure gateway 604, similar to secure gateway 404 (FIG. 4). Title server 605 may include a topology server/service 607, broadcast service 609, web service gateway 611, and feedback server 613.

Topology server 607 may act as an initial point of contact for each game console 602(n), based on key distribution server 432 providing the address for topology server 607 as the address for title server 605. Alternatively, the IP address provided for title server 605 may resolve or redirect to topology server 607. Topology server 607 then provides each game console 602(n) with an IP address for a requested service. For example, participant clients 602(1) . . . 602(4) might request the address of broadcast service 609 so that participant clients 602(1) . . . 602(4) each know where to send game telemetry data for rebroadcasting. Similarly, spectator clients 602(5) . . . 602(8) might request the address of feed distributors 617 so that the spectator clients 602(5) . . . 602(8) know from which server to request a video game feed for spectating. Topology server 607 points clients to a currently appropriate location for a requested resource, thereby maximizing the availability and quality of service. Where a spectator feed is relayed by two or more broadcast servers, the topology server, at any instant in time, redirects clients to the server with least load to offer the best quality of service. The topology server thus enables robustness in the system by handling redundancy requirements.

Web service gateway 611 acts as an interface through which game consoles or other devices can register games to be spectated. Web services server 621 (e.g., an IIS server) communicates with database server 623, e.g., an SQL database server, to monitor games available for spectating, as well as how many spectators are presently spectating each game. The web service getaway 611 enhances scalability and manageability, by implementing the caching of requests, retries in case of failures, and distribution of work among several IIS servers when applicable. The web service gateway 611 may also keeps track of and manage contextual information (after authenticating the client). The web service server 621 then executes the requests that require database access based on instructions received from the web service gateway 611.

Feedback server 613 may receive feedback from participant clients 601 and spectator clients 603, and provide that feedback to participant clients 601. Feedback to participant clients may include, e.g., an indication of how many spectators are watching the game session. Such an indication may be included on or near a score table, e.g., by showing a small camera followed by the total or estimated number of spectators. The title server also enables spectators to affect the game world for live feeds by enabling them to provide live feedback. Live feedback may include any information collected on a spectator client and sent to the title server. The title server may process and aggregate feedback prior to sending the feedback to the broadcast clients (participant clients), or the title server may simply forward feedback without altering its content. The participant clients can then use the feedback data according to their design. For example, spectator clients may be able to provide feedback indicating applause or clapping. The title server might aggregate applause feedback from all spectator clients, and send an indication to the participant client(s) of the amount of applause or percentage of spectators providing applause feedback. The participant client might use that indication, e.g., to determine the energy of the simulated spectator crowd in a sports game, to award bonus points, or perform some other action.

As indicated above, broadcast service server 609 receives game telemetry data from participant clients 601. The game telemetry data provided by each participant client 602(1) . . . 602(4) as a result of participating in the video game is determined by each video game, and may, e.g., be the same or similar game telemetry data sent by each participant client 602(1) . . . 602(4) to each other participant client 602(1) . . . 602(4) as part of a multiplayer game. That is, whatever data each participant client 602(1) . . . 602(4) is required to transmit to each other participant client 602(1) . . . 602(4) by virtue of participating in the multiplayer game, may further be sent to broadcast service server 609. Alternatively, a specific participant client may be designated as a game session host and may assemble the data for all participant clients and send the assembled data to the broadcast service server 609. The game telemetry data may include, e.g., positional and movement information, participant identification information, game session identification information, descriptive information, and the like.

Broadcast service server 609 forwards all received game telemetry data to one or more filter servers 615. Each filter server analyzes the received data and processes and/or conglomerates the data into a single stream of data, referred to as a spectator feed. That is, where each participant client sends an individual stream of game telemetry data for the players of that participant client, the filter server 615 analyzes the data received from each participant client, and assembles the data in chronological order according to a game timestamp within each data stream. That is, the individual streams of data may be received in an order other than in which the game events occur. The filter server reassembles the individual streams (or reorders the single stream received from the game session host) from the order in which they were received into game time chronological order, as necessary (i.e., performs time synchronization of the received data). Once reassembled, the filter server sends the spectator feed to a feed distributor 617 for further distribution to spectators. Where the telemetry data received from participant clients is suitable for direct transmission as a spectator feed, the filter server may get bypassed, and broadcast service servers may forward the game telemetry data directly to one or more feed distributors for transmission to spectator client. Feed distributors are likewise optional, as a single broadcast service server may provide the spectator feed transmissions where a single server has the resources to accommodate all the spectators.

Figure 15:
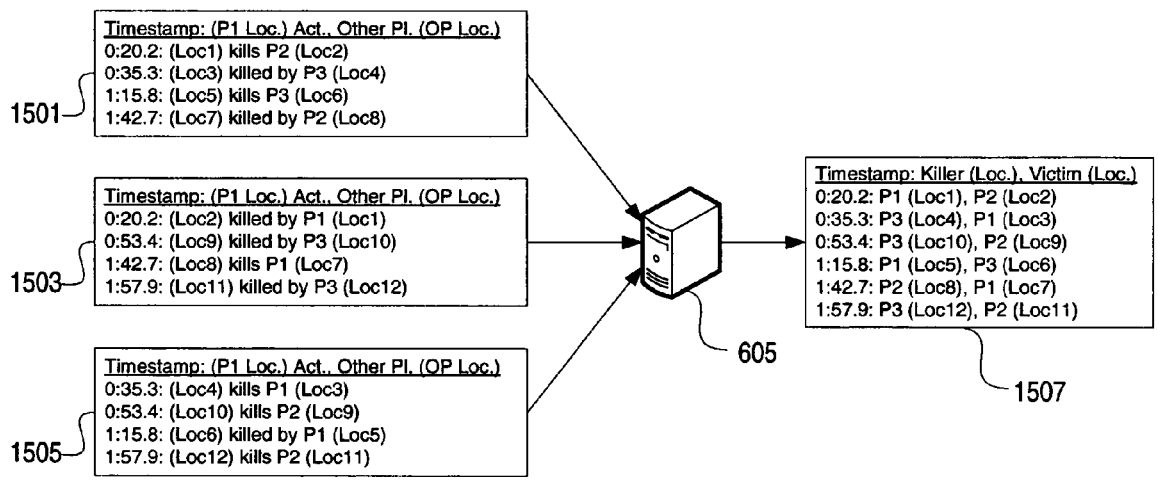
FIG. 15 illustrates data analysis and conglomeration at a title server according to one or more illustrative features.

FIG. 15 conceptually illustrates data analysis and reassembly in the title server. In FIG. 15, title server 605 receives three game session telemetry data files 1501, 1503, 1505, corresponding to player 1 (P1), player 2 (P2), and player 3 (P3), respectively. Title server 605 (e.g., at filter server 615) analyzes the data files, optionally confirms that all data appears accurate (e.g., timestamps and kills match—player 3 should not report an extra kill when neither player 1 nor player 2 report having been killed that extra time), and outputs the processed data 1507. Processed data 1507 includes, for example, a timestamp of an event, and the event data. Here, the event data includes an identification of a player character that killed another player character, the location of the killing player character at the indicated time, an identification of the killed (victim) player character, and the location of the killed player character at the indicated time. The single game session file 907 may further include movement telemetry data (player movements), action telemetry data (player actions and/or object movement, e.g., firing weapons, driving vehicles, falling rocks, dust particle information, etc.), and objective data, e.g., bomb or flag carrying information, when the multiplayer game type so provides.

Filter servers 615 may embed game checkpoints within the spectator feed. That is, if the filter servers provided spectator feeds that only include updated or incremental game telemetry data, which includes positional and input updates, new spectators might not be able to begin spectating after the beginning of the game because the spectator client might not know the initial state from which to apply the game telemetry data. Thus, each filter server may periodically embed a checkpoint in the spectator feed, from which any spectator can begin viewing the game feed, and from which point the spectator client may apply the newly received game telemetry data. A checkpoint includes complete game state data at a given point in the game, e.g., all game state data necessary to begin spectating a game, such as map name, current locations of all pertinent players, objects, etc. Checkpoint data might also include metadata indicating that a noteworthy event is occurring within the video game, which may be used to create a subsequent highlight reel (discussed further below). Checkpoint metadata may further include an indication of weapons or equipment being used within a video game, so that spectators can learn what they need to accomplish similar tasks. Filter server 615 may establish a checkpoint periodically, e.g., every 10 seconds, or on demand whenever the participant client(s) send complete game state data to the title server 605. Video game developers may further include instructions in a video game title to send checkpoint data to title server 605 at specific intervals or when specific events occur within a game session. When a spectator requests to begin spectating midgame, the title server (e.g., feed distributor 617 described below) may begin serving a game feed from the last checkpoint and then send all data since the last checkpoint.

Each title server may have one or more filter servers 615, depending on how many spectator feeds the title server desires to provide for spectating. For example, a single spectator feed might be provided where only a single game is available for spectating. FIG. 6 illustrates architecture 600 with two filter servers 615(X) and 615(Y). Each filter server may provide a different spectator feed, and spectators can select which spectator feed to view, as further described below. Any number of filter servers 615 may be individually configured at the title server, and each filter server 615 registers with web services 621 to identify available spectator feeds for a video game. There need not be a separate filter server for each spectator feed, as a single filter server 615 may be able to accommodate multiple spectator feeds.

Upon creation of a particular feed, each feed server 615(X), 615(Y) outputs the spectator feed to a corresponding feed distributor 617(X), 617(Y) for further transmission to spectator clients 602(5) . . . 602(8). Each feed distributor 617 (or filter server 615, or some other node in the title server) may optionally insert an artificial delay in the rebroadcast for spectators so as to prevent cheating. For example, each feed distributor may insert a delay, e.g., of at least 5, 10, 30 or so seconds (this setting may optionally be user configurable at participant clients), so that a participant player cannot spectate on a second machine while playing in the game session on a first machine. Alternatively, the delay may be indicated by an embedded value in the spectator feed, and each spectator client might handle the delay by buffering the received spectator feed for the specified amount of time before outputting the feed on a connected display for viewing.

In the example of FIG. 6, a first group 619(X) of spectator clients 602(5) and 602(6) have registered and receive the feed created by filter server 615(X) and distributed by feed distributor 617(X), and a second group 619(Y) of spectator clients 602(7) and 602(8) have registered and receive the feed created by filter server 615(Y) and distributed by feed distributor 617(Y).

In the architecture 600 of FIG. 6, each spectator client 602(5) . . . 602(8) might be required to have the video game title executing in order to spectate a game, e.g., because the feed distributors are providing the same game telemetry data that game consoles provide to each other during a game session. The game telemetry data might only contain positional and action information, and might not include an entire video stream such as an MPEG or other movie or audiovisual data file. The spectator game consoles thus use the video game executing on each game console to render and display the game feed using the same video game engine being used by the participant clients 602(1) . . . 602(4). In an alternative embodiment of architecture 600, feed distributors 617 (or some intermediate node between filter servers 615 and feed distributors 617) may include one or more game consoles or other computers, servers, or the like executing the video game engine based on the telemetry data output by the filter server(s) 615. The video output of the executing video game may be captured and streamed by feed distributors 617 as an audiovisual file (e.g., WMA, MOV, etc.) for subsequent receipt and processing by any spectator client data processing device capable of handling such a data file. Thus, a spectator client could receive an audiovisual file depicting a feed of a video game for which the spectator client is not independently executing the video game.

Using the above or similar architecture, a title server 605 may, in addition to broadcasting spectator feeds, maintain statistics of spectator feed broadcasts that can be communicated back to the spectators or the broadcasters. For example, participant and spectator clients can know how many people are currently watching, how many watched over time, and optionally even who are the spectators. That information can be further exploited through the game user interface or in the game play itself.

Figure 7:
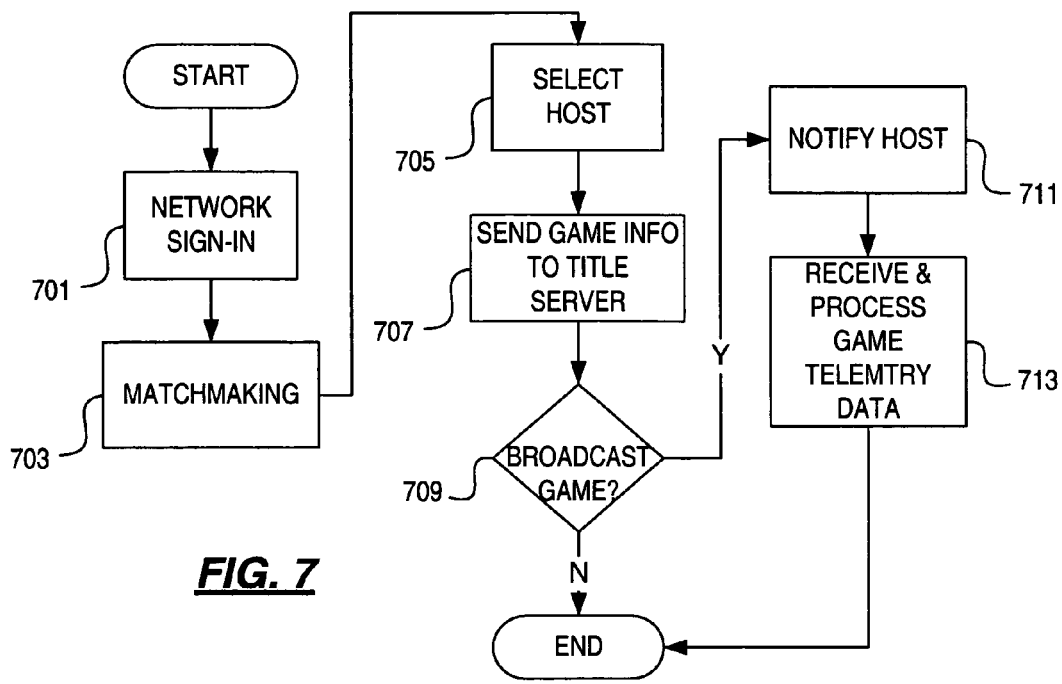
FIG. 7 illustrates a flowchart of a method for registering a game session with a title server for spectating by others.

FIG. 7 illustrates a method for a participant client or clients to register a game available for spectating to a title server. In step 701 each participant client, or user of each participant client, attaches to or logs in to a gaming network, e.g., the XBOX® Live network, via key distribution server 432 and data center 410(1) (FIG. 4). In step 703 the participant clients are matched into an online multiplayer session of a particular video game being run by each participant client. Once matched, the participant clients optionally select one of the participant clients to act as a game session host in step 705. The game session host then provides initial game session information to broadcast service server 609 (FIG. 6) in step 707. The initial game session information may include, e.g., a game type (e.g., slayer, capture the flag, etc.), participant information (e.g., gamertags of the participants, skill levels or ranks of the participants, etc.), an identification of a game level or map, and other descriptive information regarding the game session. The initial game session information may also include an indication that the participant players have selected an option to allow the game to broadcast, if selected. That is, there may be a participant configurable setting to keep the game private, and not allow rebroadcasting for spectators.

Figure 8:
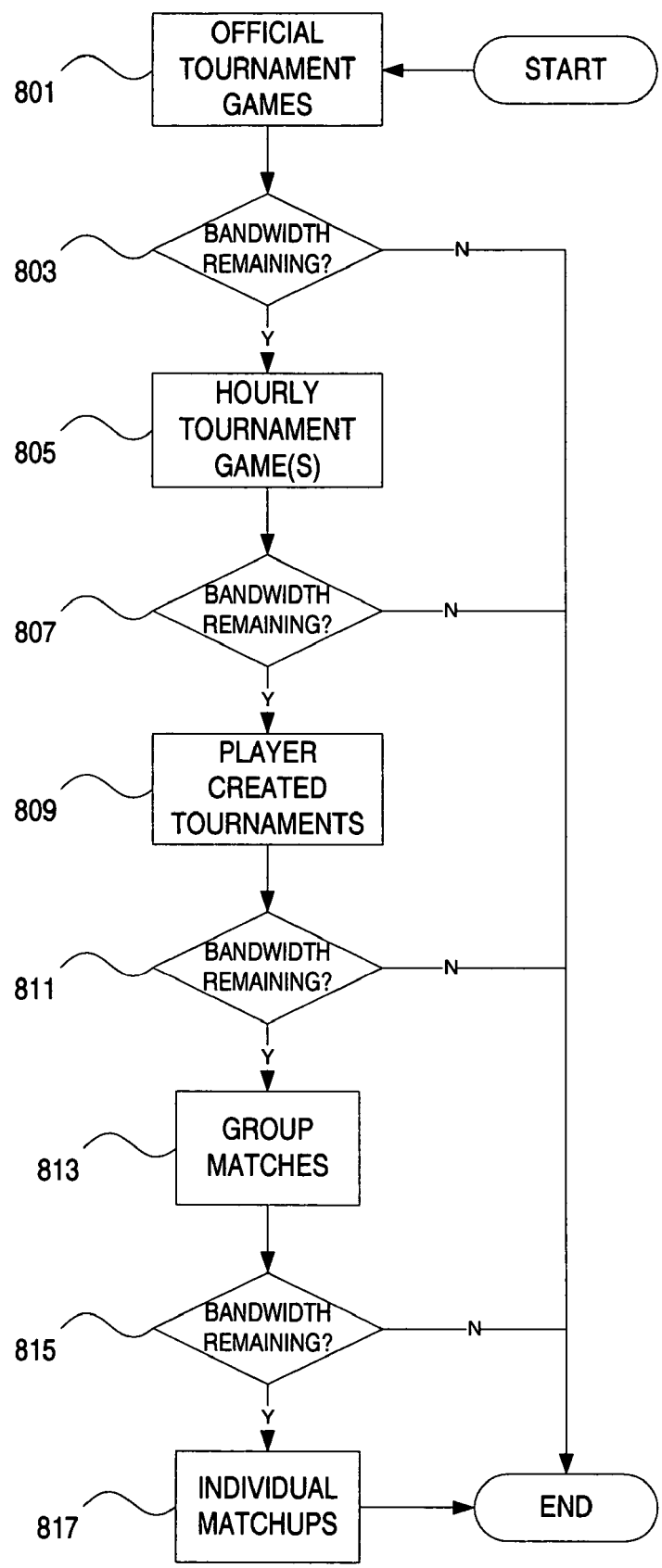
FIG. 8 illustrates a flowchart of a method for selecting game sessions to make available for spectating.

In step 709 the title server determines whether or not to broadcast the video game to non-participants. For example, there are routinely over 500,000 game sessions per day for the game title HALO® 2 on the XBOX® Live network. During testing, a 1.5 Gb/sec connection serves approximately 900,000 player spectators (PxS). One PxS refers to one spectator watching one game with one player in the game. Thus, 1,000 spectators watching a 64-player game uses 64,000 PxS of bandwidth. The selection of how many games is thus limited by available bandwidth accordingly. If a title server cannot simultaneously broadcast every game session, e.g., due to lack of sufficient computer and/or bandwidth resources, the title server uses some logic to identify which game sessions to broadcast. FIG. 8, described below, describes one such methodology which may optionally be used. If in step 709 the game session is not selected for broadcast, the title server notifies the session host (or all participant clients in the game session) that they should not transmit game telemetry data to broadcast service server 609. Alternatively, broadcast service server might simply ignore data received regarding that game session if participant clients do send game telemetry data to title server 605.

If the game session is selected for broadcast in step 709, then in step 711 the title server optionally notifies the game session host (or all participant clients in the game session) to provide game telemetry data to broadcast service server 609, or notifies broadcast service server 609 not to ignore received data corresponding to that game session. In step 713 broadcast service server 609 begins receiving and processing the received game telemetry data, as described above.

FIG. 8 illustrates a sample method which may be used to select which game sessions to rebroadcast for spectating. The methodology of FIG. 8 is but one example, however, and other methodologies may be used. Initially, in step 801, a title server (e.g., through broadcast service server 609 or web services server 621, selects all game sessions from official tournaments, such as tournaments sponsored by the publisher of the video game, by the provider of the gaming network, or by some other official sponsor.

In steps 803-805, if there is PxS bandwidth remaining and the number of broadcast game sessions has not yet reached an administratively defined maximum number (e.g., 50), the title server selects one or more game sessions from hourly or mini-tournaments. For example, the title server might always select the top game or games in the tournament, and select lower games where a particularly interesting participant player is participating (e.g., a highly ranked player).

In steps 807-809, if there is PxS bandwidth remaining and the number of broadcast game sessions has not yet reached the administratively defined maximum number, the title server selects one or more game sessions from player created tournaments where a particularly interesting participant player is participating (e.g., a highly ranked player). In steps 811-813, if there is PxS bandwidth remaining and the number of broadcast game sessions has not yet reached the administrative defined maximum number, the title server selects one or more game sessions from group matches where a particularly interesting group of players is participating (e.g., a highly ranked group). Group matches refer to matchups of two organized groups of players, and may include, e.g., clan matches in Halo® 2, car club matches in Forza Motorsport®, and the like.

In steps 815-817, if there is PxS bandwidth remaining and the number of broadcast game sessions has not yet reached the administratively defined maximum number, the title server selects one or more game sessions from individual matchups where a particularly interesting participant player is participating (e.g., a highly ranked player).

Various modifications and alternatives are also possible in selecting matches. For example, a title server might always want at least a minimum number (e.g., 25) of game sessions available for spectating, while never exceeding a maximum value (e.g., 50), and may set criteria accordingly. For example, when selecting matchups to make available for spectating based on the ranking of participant players in the game sessions, the title server may adjust the minimum required player rank so as to provide a number of game sessions between the minimum and maximum numbers. In one variation, a player's rank must be in the top 25% of all players within the last 24 hours in order to qualify to have his or her matchup or game session made available for spectating. In another variation, when at least 25 games are being broadcast for spectating, any new player might be required to be better than all players in a predetermined ranked game, e.g., in the $10^{th}$ highest-ranked game being broadcast, before that player's game session will be included for spectator broadcast. Similar logic can be used for group matchups. Other variations are of course possible as well.

The title server may also adjust the number of game sessions available for spectating based on the number of active spectator clients. When fewer people are spectating, and thus using fewer PxS, the title server may make more game sessions available for spectating. For example, the title server may use a PxS bandwidth meter to determine criteria new games must meet in order to be selected for spectator broadcast. As the bandwidth meter goes up, the criteria goes up for new games to qualify to be available for spectators. For example, at up to 50% PxS (i.e., the PxS value is presently 50% or below of the maximum sustainable PxS), the title server might not implement stricter controls or selection criteria than noted above. However, as the bandwidth meter climbs above 50% PxS, the minimum required ranking may increase. For example, at 80% PxS, the title server might block any new games from being broadcast other than Official or hourly tournament games. At 95% PxS all new games and/or spectators may be blocked, except optionally Official tournament games or a championship game.

According to a variant of the game session selection criteria and methodology, a player or group may purchase PxS bandwidth or a guarantee to ensure that a game session will be made available for rebroadcast. For example, a player or group may pay a nominal broadcast or booking fee via a marketplace incorporated into the online network over which the game is to be played, thereby reserving PxS bandwidth or otherwise ensuring that their game session is broadcast for spectators. Such a marketplace is incorporated in the XBOX® Live network. The booking fee may vary, depending on the PxS purchased. For example, a 10 credit or $0.10 booking fee might be required to guarantee 256 PxS for a single game session, thereby allowing up to 16 spectator client for a single 16-player game. Alternatively, the PxS purchase might be for an allotted period of time or for a specified number of game sessions.

Figure 9:
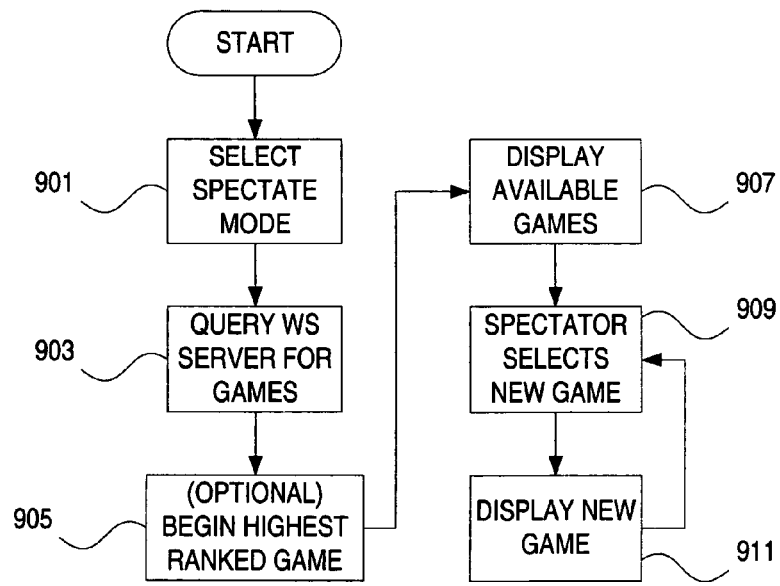
FIG. 9 illustrates a flowchart of a method for selecting a game session to spectate.

FIG. 9 illustrates a method for a spectator to select a game session to spectate. Initially, in step 901, the user of a potential spectator client selects a spectator mode option from a menu. Upon selection of spectator mode, the potential spectator client queries the title server, via web services server 621, for game sessions being broadcast for spectating. Upon receiving the query response, the potential spectator client in step 905 may optionally automatically request, or the web services server 621 may automatically notify a feed distributor 617 to initiate, a default spectator feed, e.g., a presently highest ranked broadcast game and/or a game that has started within some recent period of time. The game console in step 907 may overlay a menu over the default spectator feed, thereby providing the user a list of one or more additional spectator feeds available for spectating from which the user of the spectator client can choose. The user in step 909 selects a different spectator feed for spectating, and in step 911 the spectator client requests the different game feed via web services server 621, which in turn notifies a corresponding feed distributor 617 to provide the spectator feed to the requesting spectator client.

Because the spectator feed may include the same telemetry data as is provided to participant clients, when the spectator client is executing the video game title, the spectator client may provide a variety of visual modes for spectating. For example, the spectator client may output video in a first or third person point of view, the spectator client may follow a particular participant or switch among participants (Player Cam), the spectator client may rotate through pre-positioned cameras within the simulated environment in which the video game is being played (Level Cam—the prepositioning may be performed by the game title developers and be embedded within the game map or level files), the spectator client may allow a spectator user to freely navigate the simulated environment while the game is being spectated (Ghost Cam), etc. Any actions by the spectator client and/or spectator user do not affect the ongoing game because no telemetry data is sent from spectator clients back to the participant clients. Thus, the spectator client's capabilities and views are limited only by the capabilities developed and provided in the video game title. For example, a video game title may include a Crossfire Spectator mode, in which a virtual player of a spectator user in Ghost Cam mode may be "injured" by gunfire and other dangerous events in the game being viewed according to the damage model of the game engine of the video game title. If the virtual player "dies" the spectator may respawn at any available spawn point built into the game being viewed.

Figure 10:
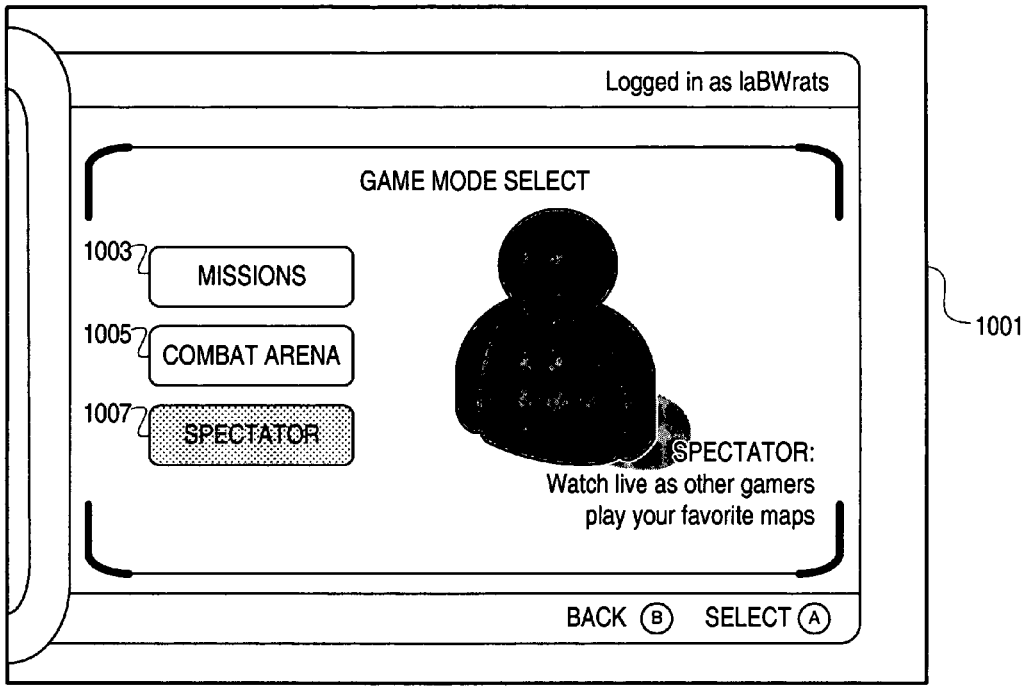
FIG. 10 illustrates a sample screenshot according to one or more illustrative features.

An illustrative system using various aspects described herein is illustrated with respect to FIGS. 10-14. FIG. 10 illustrates a menu screen 1001 of a video game title, through which a user (here, a player having the GamerTag "laB-Wrats") selects whether to play a single player game using option button 1003, multiplayer game using option button 1005, or enter a spectator mode using option button 1007. The user may use a game controller thumbstick or D-pad to navigate choices, an 'A' button on the game controller to select a choice, and a 'B' button on the game controller to go back a menu. In the example of FIG. 10, the user has highlighted Spectator option 1007, and presses the 'A' button to enter spectator mode.

Figure 11:
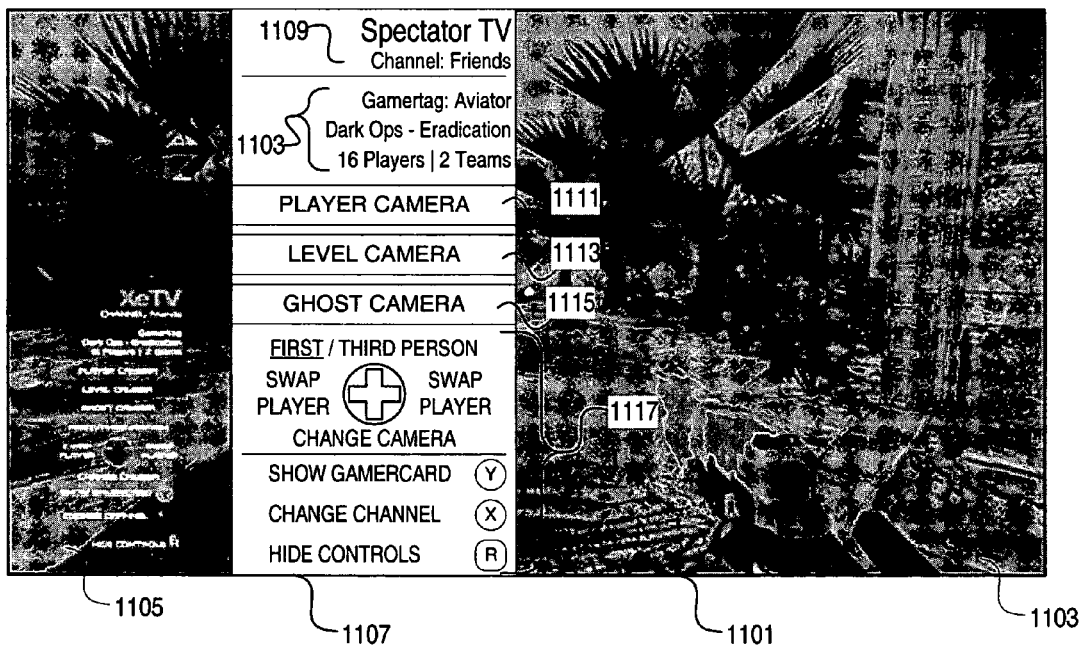
FIG. 11 illustrates a sample screenshot according to one or more illustrative features.

Upon entering spectator mode, FIG. 11 illustrates screen 1101 in which a default game session 1103 has been selected and initiated for spectating. A menu 1105 may be overlaid over a portion of screen 1101, or the user may call up the menu 1105 upon activation of a predetermined control on a game controller or other control device communicately connected to the spectator client. An enlarged view 1107 of menu 1105 is also provided for clarity in FIG. 11. View 1107 illustrates that menu 1105 may include channel information 1109, game session information 1103, and various control options. Control options may include a selection button 1111 for selecting a Player Cam view, a selection button 1113 for selecting a Level Cam view, and a selection button 1115 for selecting a Ghost Cam view. Menu 1105 may further provide control information 1117, e.g., indicating that the D-pad may be used to swap Player Cams (e.g., follow a different player in Player Cam mode), change from first to third person views (and vice versa) while in Player Cam mode, and change cameras in Level Cam mode. The spectator may also be able to pan, tilt, and zoom cameras using the thumbstick controls. The spectator can view a profile of a current player (e.g., a GamerCard) in Player Cam mode by providing predefined input.

Figure 12:
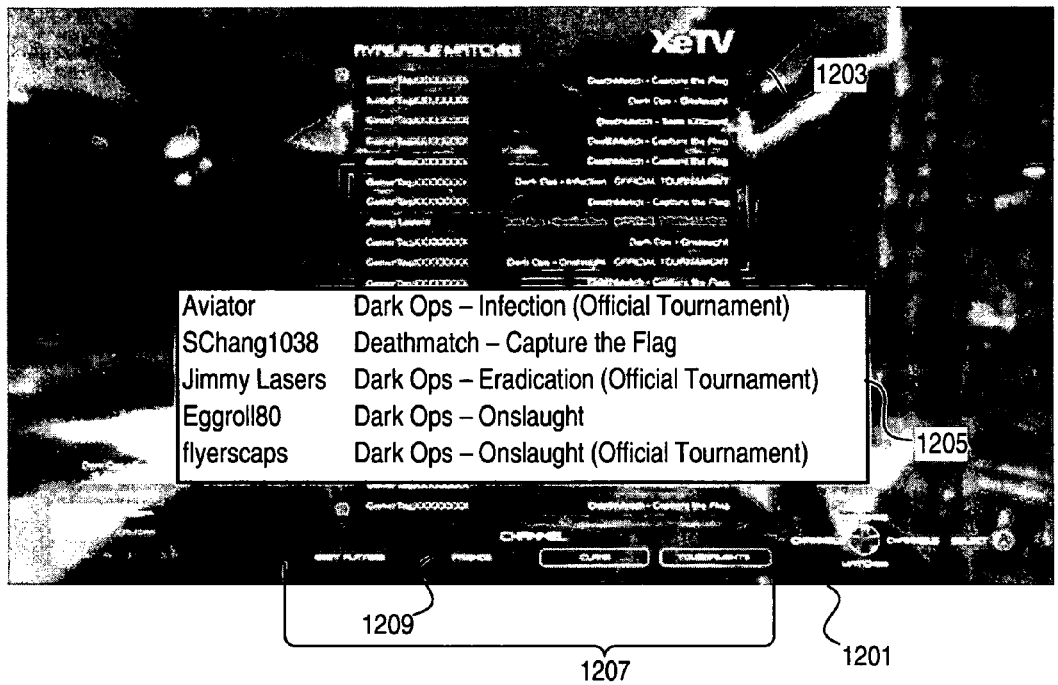
FIG. 12 illustrates a sample screenshot according to one or more illustrative features.

From screen 1101, when the user selects the option to change channels, e.g., by pressing the 'X' button on a game controller, screen 1201 of FIG. 12 may be displayed. The spectator feed on screen 1201 may be displayed with a slightly blurred appearance to provide focus to feed list menu 1203. A portion of menu 1203 is shown in the enlarged view 1205. As indicated in the lower right of screen 1201, a user may use the up and down controls of the D-pad to select a spectator feed within a current channel 1209 selected from the available channels 1207. The user may change channels using the right and left controls on the D-pad. Upon selection of another channel in channel list 1209, feed list menu 1203 automatically updates to display the feeds available within the newly selected channel. Upon selecting a new feed, the game console sends the selection to web services server 611, which in turn instructs a corresponding feed distributor server to begin sending the spectator feed to the spectator client, and the screen display goes back to an appearance similar to that in FIG. 11, while displaying the new spectator feed.

Game feeds may be organized into one or more channels 1209 based on one or more channel criteria to provide a sorting mechanism and refer to the type of games included in that channel. For example, a Best Players or Heroes channel may list game feeds for the highest ranking players presently playing game sessions which are open to spectators; a Friends channel may list any available game feeds in which at least one player on a Friends List of the spectator is competing; a Clans (or Groups) channel may list game feeds for the highest ranking groups presently playing game sessions which are open to spectators; and a Tournament channel may list game feeds for ongoing tournament matches. Other channels may include a Learning channel (e.g., with feeds providing hints, cheats, walk-throughs, etc.), a Highlights channel (e.g., with clips from the days best matches), and/or an Archives channel (e.g., with previously distributed and/or recorded spectator feeds). A separate channel and/or the channel listings described above may include listings for previously played (recorded) game sessions, game sessions that are currently playing (e.g., "live" games), or game sessions that are scheduled to be played at a future time.

Figure 13:
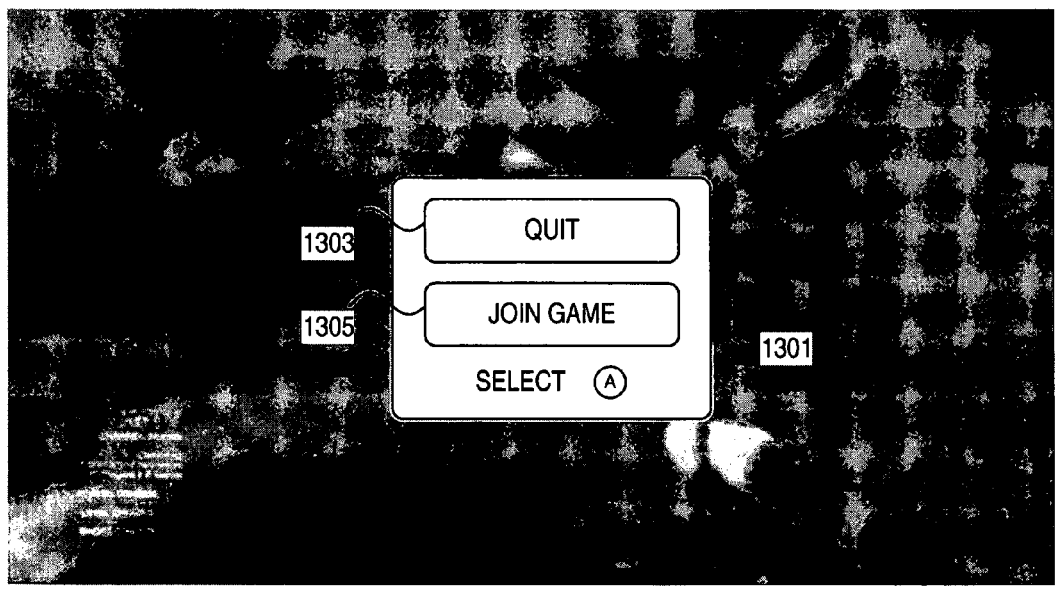
FIG. 13 illustrates a sample screenshot according to one or more illustrative features.
Figure 14:
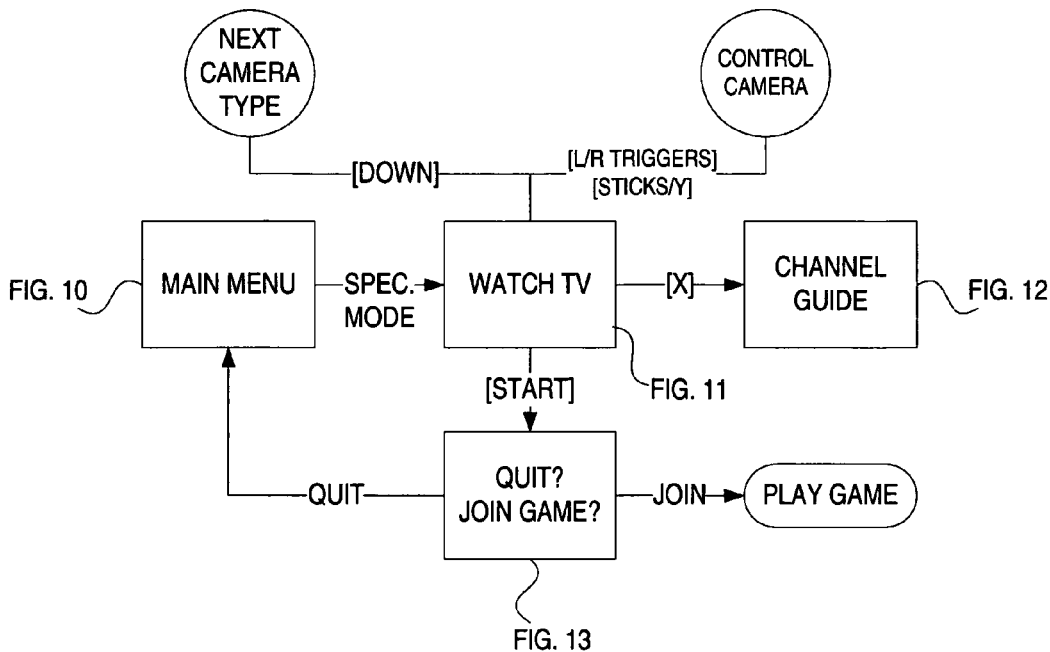
FIG. 14 illustrates a state diagram according to one or more illustrative features.

As illustrated in FIG. 13, when a user selects a predetermined input, e.g., the 'B' button, while watching a spectator feed the game console may display menu 1301 through which the user can quit spectator mode using selection button 1303, in which case the game console may return to screen 1001. If the user qualifies according to a predetermined metric, the game console may also provide the user an option 1305 to join the game being viewed. For example, the user might be given the option to join the game if the game is an open game for which the user does not need to separately qualify, and the user has a ranking meeting some predefined criteria, such as a ranking commensurate with the current participants in the game being spectated. FIG. 14 illustrates a state diagram of user input controls and transitions between screens and menus provided thereon, as illustrated in FIGS. 10-13.

Various modifications or alternatives may be made without departing from the spirit and scope of the invention. For example, a filter server 615 may create a highlights reel and provide the highlights reel as a separate spectator feed which a spectator client may request and display for viewing. Additionally, filter servers may record entire game sessions for distribution as spectator feeds at a later time, such as game sessions where a player accomplished a particularly difficult achievement, performed particularly well (e.g., the championship match of an official tournament), or otherwise performed in a noteworthy fashion. The title server may optionally charge a spectator to view pre-recorded game sessions. For example, the spectator could pay 25 credits or $0.25 through the integrated marketplace, and in exchange receive a "hint" spectator feed which teaches the spectator user how to accomplish a certain feat or goal within a video game title. The title server may further customize such "hint" spectator feeds by overlaying a picture of a game controller on the screen to guide the spectator user through the particularly difficult task.

Thus, using various features and aspects described above, a video game publisher or developer may provide a system through which more players than can participate in a video game can spectate a game session of the video game, optionally regardless of whether the spectator client is also executing the spectated game title. Illustrative aspects described herein may be applied to both single-player and/or multi-player games. For example, a player may use spectator mode to review game feeds to analyze problems and difficulties for that player in a single-player mode of a game. Various inputs, functions, modules, procedures, servers, and/or other mechanisms may be used to perform features described herein. The present application includes any novel feature or combination of features disclosed herein either explicitly or any generalization thereof. While the features have been described with respect to specific examples including presently preferred modes of carrying out the invention, there are numerous variations and permutations of the above described systems and techniques. Thus, the spirit and scope of the invention should be construed broadly as set forth in the appended claims.

We claim:

1. One or more computer storage media storing computer executable instructions for performing a method of distributing game telemetry data corresponding to a game session of a video game to a spectator client to allow a user of the spectator client to spectate the game session, said method comprising steps of:

receiving at a network location not joined in the game session, game telemetry data generated by one or more participant clients of the game session of the video game, each participant client executing the video game under the control of a corresponding participant player;

the network location creating a spectator feed by aggregating the received game telemetry data;

receiving a request for the spectator feed from a spectator client not participating in the game session;

the network location sending the spectator feed over the computer network to the spectator client;

executing the video game on the spectator client using the received game telemetry data wherein the game telemetry data comprises projectile information and wherein the executing step comprises:

establishing a ghost character representation for the spectator at the camera position; and applying the received game telemetry data against the ghost character wherein the applying step comprises the ghost character taking damage as a result of being hit by a projectile.

2. The computer storage media of claim 1, wherein the one or more participant clients and the spectator client each comprise a game console.

3. The computer storage media of claim 1, wherein creating the spectator feed comprises chronologically synchronizing the received game telemetry data when there are more than one participant clients.

4. The computer storage media of claim 1, wherein creating the spectator feed comprises capturing a video output from a game engine executing a copy of the video game based on the received game telemetry data.

5. The computer storage media of claim 1, wherein the received game telemetry data comprises a game checkpoint comprising a complete game state.

6. The computer storage media of claim 5, wherein the complete game state comprises metadata describing an event occurring in the video game at a time of the complete game state.

7. The computer storage media of claim 6, further comprising, prior to sending the spectator feed, verifying that the spectator client is authorized to receive the spectator feed.

8. The computer storage media of claim 7, wherein the verifying step comprises verifying that the spectator client submitted payment for the spectator feed.

9. The computer storage media of claim 1, wherein the at least one of the participant clients and the spectator client comprises a game console, and at least one other of the participant clients and the spectator client comprises a desktop computer.

10. The computer storage media of claim 1, wherein the game session comprises a multiplayer game session, and wherein the one or more participant clients comprise a plurality of participant clients.

11. One or more computer storage media storing computer executable instructions for performing a method for a non-participating spectator client to spectate a multiplayer game session of a video game title, said method comprising steps of:

the spectator client sending over a computer network to a title server corresponding to the video game title a request to spectate the game session;

receiving from the title server over the computer network, game telemetry data corresponding to a plurality of participant clients in the multiplayer game session; and executing the video game title on the spectator client using the received game telemetry data, wherein the executing step comprises:

establishing a ghost character representation for the spectator at the camera position; and applying the received game telemetry data against the ghost character wherein the game telemetry data comprises projectile information, and wherein the applying comprises the ghost character taking damage as a result of being hit by a projectile.

12. The computer storage media of claim 11, wherein the executing step comprises outputting for display a rendering of the video game title following a location of a participating player of the game session.

13. The computer storage media of claim 11, wherein the executing step comprises outputting for display a rendering of the video game title according to one or more prepositioned cameras in a simulated environment defined by the video game title.

14. The computer storage media of claim 11, wherein the game telemetry data comprises projectile information, and wherein the applying step comprises the ghost character taking damage as a result of being hit by a projectile.

15. The computer storage media of claim 12, wherein the participating player is selectable by a user of the spectator client.

16. The computer storage media of claim 12, said rendering being selectable by a user of the spectator client to be in either of a first-person and third-person perspective.

17. The computer storage media of claim 12, further comprising providing a user of the spectator client profile information corresponding to the participating player upon receiving predefined input from the user of the spectator client.

18. The computer storage media of claim 11, the method further comprising steps of:

receiving a request from a user of the spectator client to join the game session; and joining the spectator device to the game session.

19. The computer storage media of claim 11, wherein the executing step comprises outputting for display a rendering of the video game title according to a camera position selected by a user of the spectator client, the camera position in a simulated environment defined by the video game title.

20. The computer storage media of claim 11, wherein the executing step comprises receiving movement input from the user of the spectator client, and wherein the method further comprises moving the camera position based on the received movement input.

* * * * *